May 24, 1966 K. A. ANDERSON 3,252,577
FILTER
Original Filed Nov. 27, 1961 4 Sheets-Sheet 1
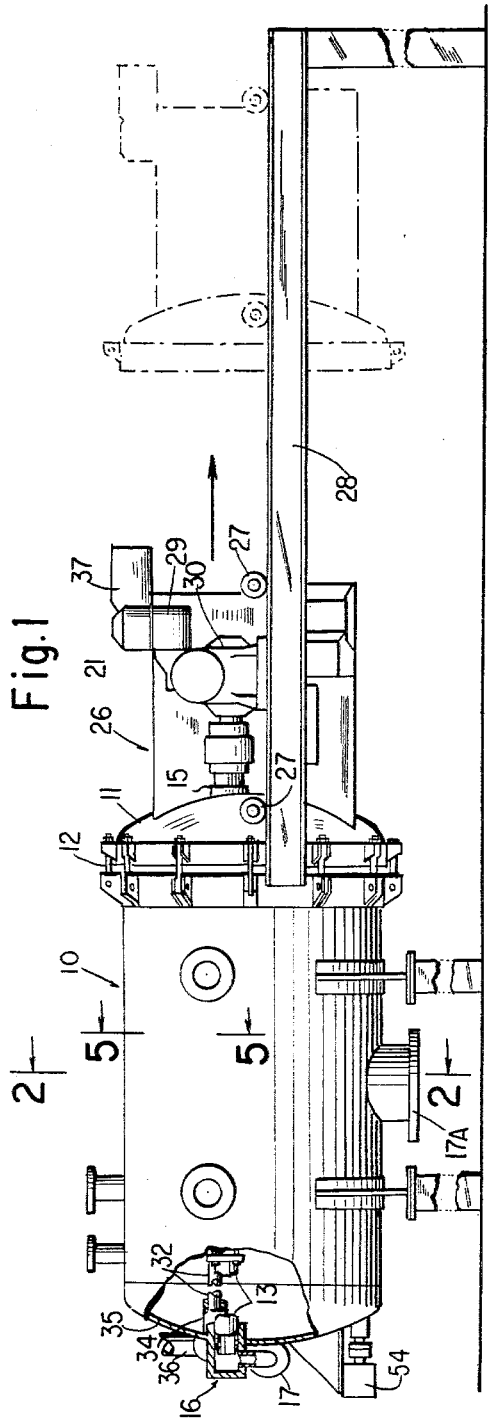
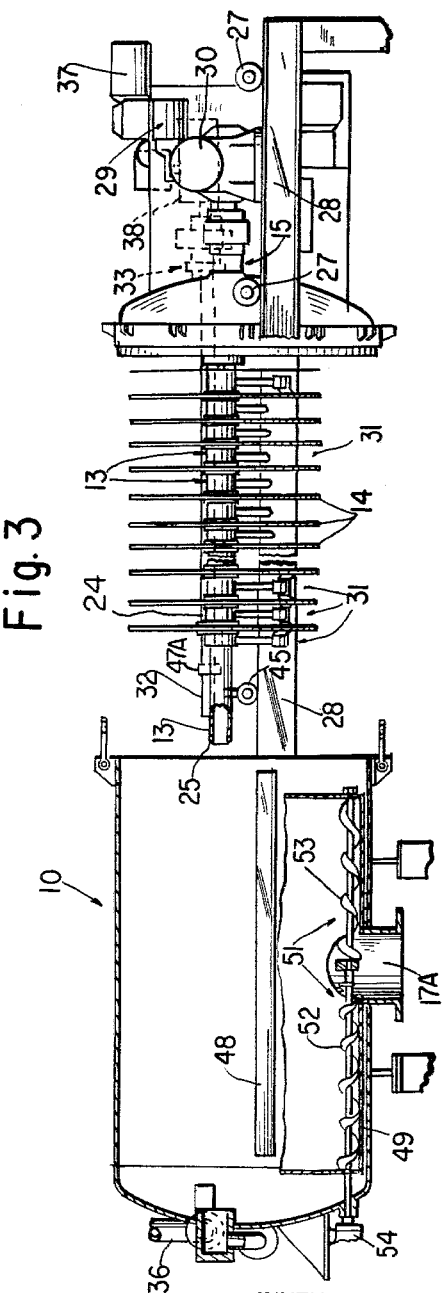
INVENTOR
KENNETH A. ANDERSON
BY
Robertson Smythe & Dryer
ATTORNEYS May 24, 1966  K. A. ANDERSON  3,252,577
FILTER
Original Filed Nov. 27, 1961  4 Sheets-Sheet 2
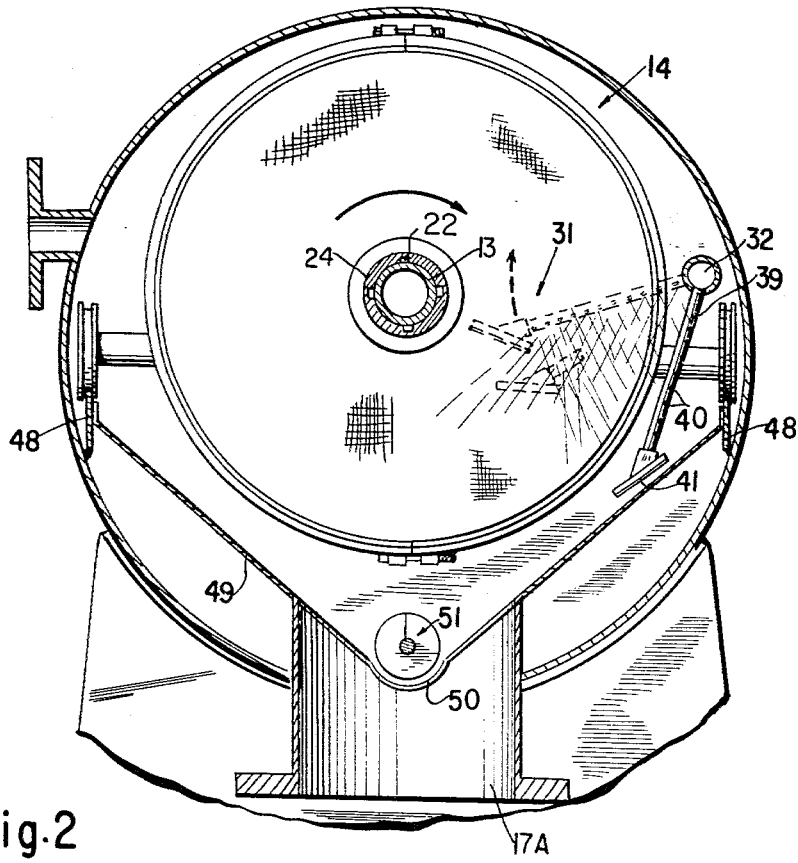
Fig. 2
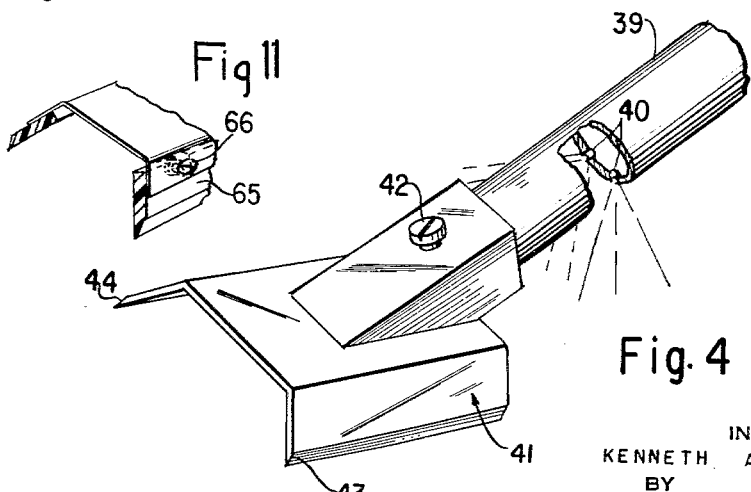
Fig 11
Fig. 4
INVENTOR
KENNETH A. ANDERSON
BY
ATTORNEYS May 24, 1966 K. A. ANDERSON 3,252,577
FILTER
Original Filed Nov. 27, 1961 4 Sheets-Sheet 3
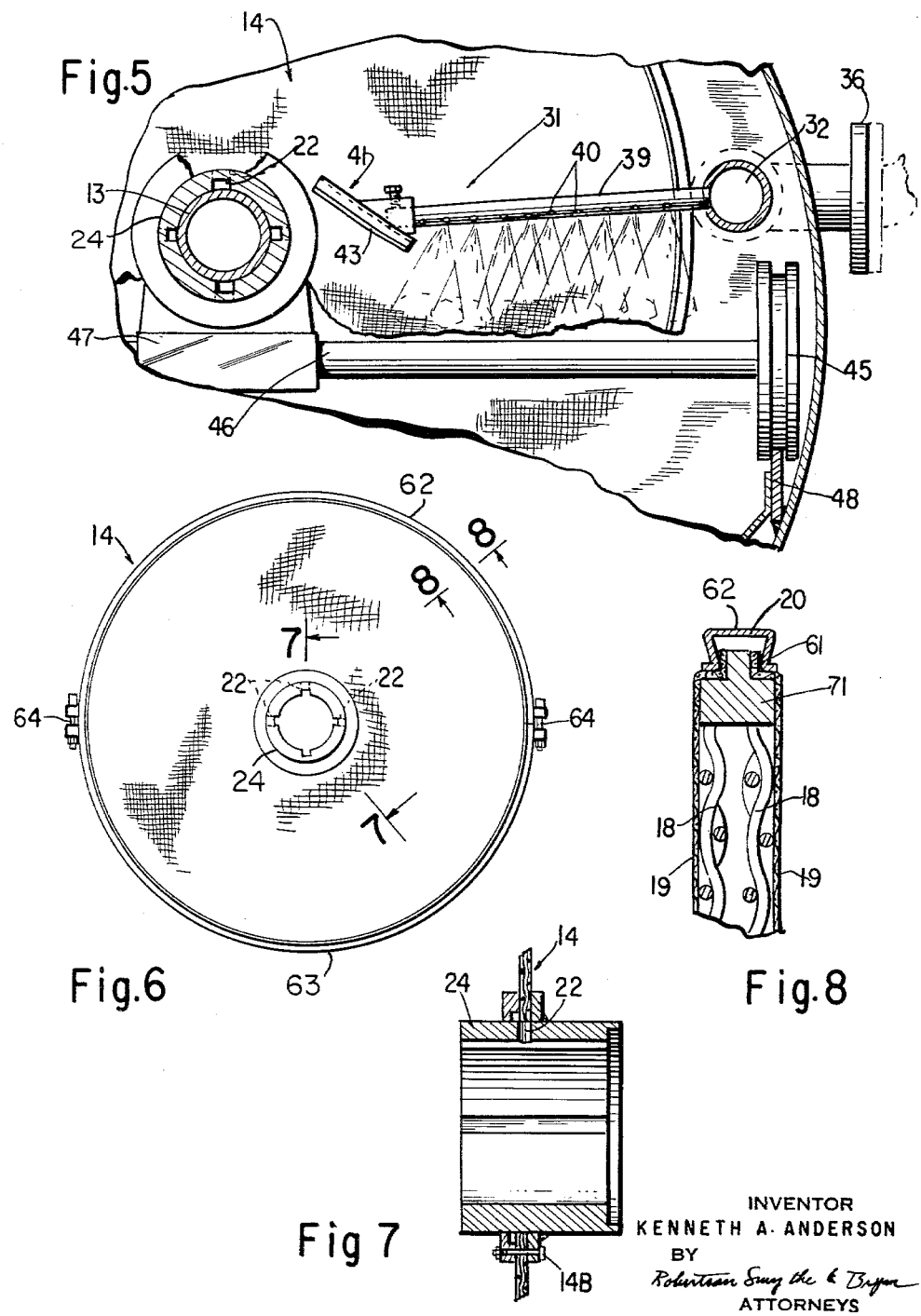
INVENTOR
KENNETH A. ANDERSON
BY
Robertson Bryant the & Bryan
ATTORNEYS May 24, 1966 K. A. ANDERSON 3,252,577
FILTER
Original Filed Nov. 27, 1961 4 Sheets-Sheet 4

INVENTOR
KENNETH A. ANDERSON
BY
Robertson Smythe & Bryan
ATTORNEYS

United States Patent Office 3,252,577
Patented May 24, 1966

3,252,577
FILTER
Kenneth A. Anderson, Silvis, Ill., assignor to Ametek, Inc., a corporation of Delaware
Continuation of application Ser. No. 155,041, Nov. 27, 1961. This application Dec. 30, 1964, Ser. No. 422,153
1 Claim. (Cl. 210—236)

This application is a continuation of application Serial Number 155,041, filed November 27, 1961, and now abandoned.

This invention relates to filter apparatus and particularly to cake removing arrangements for leaf type filters.

In a filter of the type involved herein, a leaf, or plurality of leaves, normally is mounted in an enclosure or tank. The material to be filtered or slurry is fed to the tank and in some instances it is desirable to deposit a filter aid or precoat on the leaves of the filter. It is necessary to remove the filter cake as it builds up on the faces of the filter leaves beyond the desired thickness. It is desirable in some applications to remove the cake while the parts are inside of the filter enclosure or tank. In one type of filtration, it is preferred to remove the cake in dry form by scraping and without sluicing action, and in another type a sluicing action is needed to remove the cake or to assist in removing or cleaning same from the filter leaves. Further, in some cases, both scraping and sluicing are needed. Prior devices have not been completely satisfactory for this purpose and have not been as flexible in operation as is desirable.

One of the objects of the invention is to provide a filter arrangement wherein filter cake can be removed from filter leaves by scraping, by sluicing or by a combination of scraping and sluicing.

Another object of the invention is to provide a filter arrangement wherein the removed cake is discharged from the filter tank efficiently.

Still another object of the invention is to provide a filter arrangement wherein filter cake can be removed without opening of the filter enclosure.

A still further object of the invention is to provide an arrangement for assembling filter leaves.

In one aspect of the invention, an enclosure or tank means is employed having a cover therefor which is openable. The cover may have assembled therewith the filter leaf means together with the cake removal arrangement to be described hereafter. The filter leaf means is mounted on the cover so as to be rotatable relative to the tank when the cover is in assembled relation thereto. Similarly, the cake removal means is mounted on a shaft having an axis outside of the periphery of the filter leaf means, the filter cake removal means having arms extending between and adjacent to the face or faces of the filter leaf means. In one form, the arm means can be supported on a hollow shaft, the arm means being arranged so as to conduct sluicing fluid from the hollow shaft to apertures located along the arm means for directing the sluicing fluid onto the faces of the leaves. Additionally, scraper means can be provided for attachment to the ends of the arm means. The scraper means or blades can be removable therefrom. When the parts are in assembled relation and it is desired to remove cake from the filter leaf means by scraping, the filter leaf is rotated and at the same time the cake removal arm means is rotated from a position completely outside of the space between the filter leaf means and across the face thereof until the arm means reaches a substantially horizontal position. The scraper blade means on the end of the cake removal arm means will serve to scrape the cake therefrom as it passes thereover.

In another aspect of the invention, a washing or sluicing fluid can be fed to the arm means so that there will be a combination of scraping and sluicing of the cake from the filter leaves. Additionally, it is possible to use the cake removal means without the scraper means so as to wash or sluice the cake from the face or faces of the filter means. In a preferred arrangement, the cover, filter leaf means and washing means are mounted on a single assembly which is slidable on tracks from the interior of the filter tank to the exterior thereof so as to gain access to the leaves or other washing parts. Further, when the assembly is moved to the exterior of the enclosure, it is possible to assemble or disassemble the scraper blades from the arm means.

In a further aspect of the invention, a conveyor means is provided to carry the removed filter cake which has dropped to the bottom of the tank from the interior thereof to the exterior even though the filter is closed. In the preferred form, a trough is located at the bottom of the tank in the lower apex of which there is a screw conveyor having a pair of helical members thereon arranged to convey material to the center of the conveyor. This will carry the removed cake to a central aperture or exhaust opening at the bottom of the tank.

In a still further aspect of the invention, each filter leaf may include a central hub upon which the leaf is carried. The exterior filter screens may be preformed to a disk form. A pair of U- or C-shaped bands or clamps may be employed on the periphery of the leaf to hold the screens in assembled relation.

These and other features and advantages of the invention will become apparent from the following specification and drawings which are merely exemplary.

In the drawings:

FIG. 1 is an elevational view of the filter with the parts in assembled relation, the elevation being partially in section;

FIG. 2 is a sectional view taken in the direction of the line 2—2 of FIG. 1;

FIG. 3 is similar to FIG. 1, showing the parts in disassembled relationship;

FIG. 4 is a fragmentary perspective view of one form of a scraper blade;

FIG. 5 is an enlarged sectional view taken in the direction of line 5—5 of FIG. 1;

FIG. 6 is a view of one form of filter leaf which may be used;

FIG. 7 is a fragmentary enlarged sectional view taken along the line 7—7 of FIG. 6;

FIG. 8 is a fragmentary enlarged view of the outer portion of the assembled filter plate.

FIG. 11 is a fragmentary view of a modified form of blade.

Figure 10:
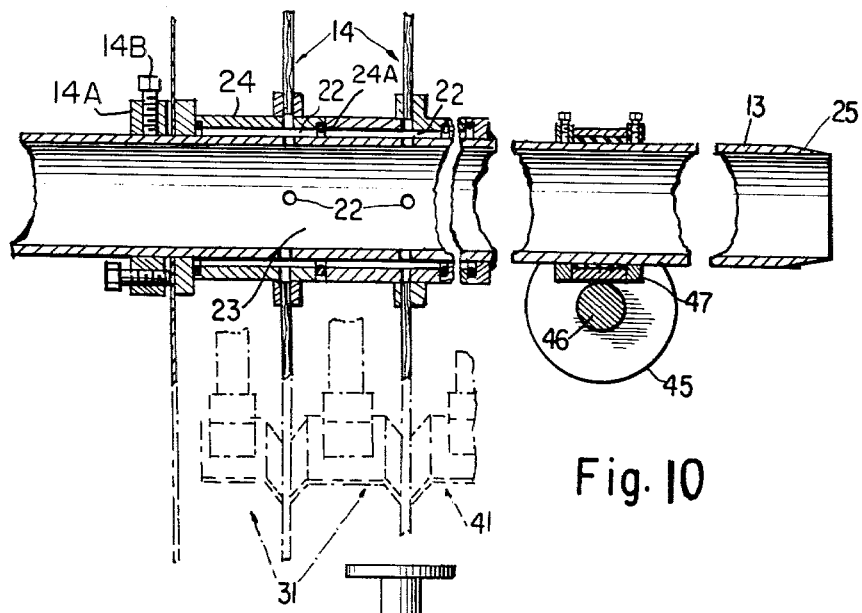
FIG. 10 is an enlarged fragmentary sectional view of the center shaft.
Figure 9:
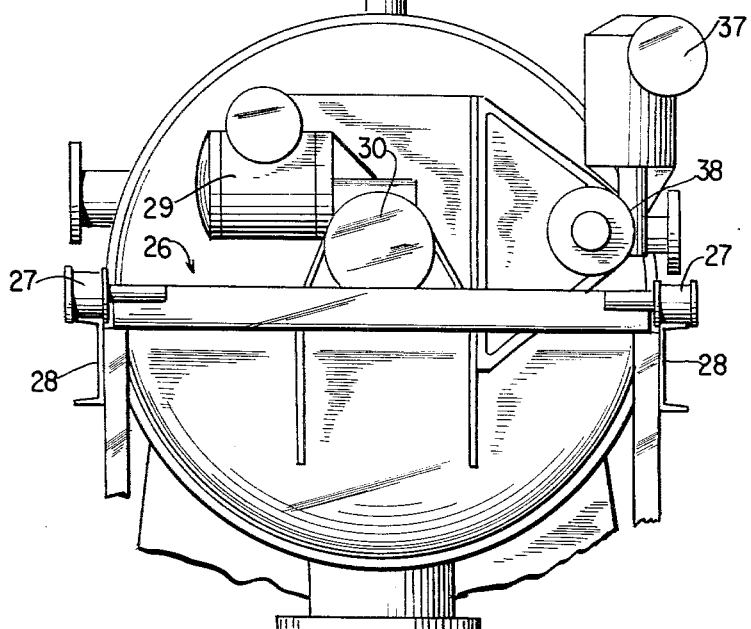
FIG. 9 is an end view of FIG. 3.

The invention will be described in conjunction with a filter of the pressure type having a removable cover at one end thereof for access to the parts. Referring to FIG. 1, filter tank 10 may have a cover 11 arranged to be held in sealed relation by means of the swinging bolt arrangement 12, as is conventional in the art. Cover 11 has a hollow center shaft 13 upon which are mounted the filter leaf assemblies 14. The hollow shaft 13 is journaled in pressure-tight bearing 15 carried on cover 11, such permitting rotation of the shaft 13 relative thereto. When the cover 11 is in closed position, the other end of center shaft 13 is held in pressure-tight bearing 16. Each of the filter leaf means or assemblies 14 may comprise a coarse wire screen 18 (FIG. 8) with the outer fine wire members 19 carried on each side thereof. The outer fine wire members can be formed at the outer edges to present a disk-shaped configuration which is clamped between clamp means 62, 63 FIG. 6. Clamp means shown generally at 20 consists of two U-shaped or C-shaped members 62, 63 held together by bolts 64. The leaf member itself is clamped between hubs 24 which in turn are axially held on the shaft 13 in assembled relation, as can be seen in FIG. 10 by flange 14A, hubs 24 being supported on shaft 13 as seen in FIG. 5. The interior of the filter leaf is connected by passages 22 to the interior 23 of hollow center shaft 13. Flange 14A has screws 14B connecting the leaf assemblies to the hubs and the shaft. The center shaft 13 may have a tapered portion 25 at the end thereof so as to facilitate its entry into pressure-tight bearing 16 as the cover and assembled parts are slid into place within tank 10 from the position of parts as seen in FIG. 3. The hubs 24 may have O-rings 24A therebetween to assist in maintaining the joints in tight relation.

Frame or carriage 26 is mounted on the cover means for supporting the arrangement for rotating the filter leaf shaft 13 as well as the cake removal means as will be described hereafter. Frame means 26 has rollers 27 thereon for cooperating with and riding on tracks 28 as the cover is moved to the right toward open position as in FIG. 3. A suitable electric or other type of motor 29 with its gear arrangement 30 is connected to the center shaft so as to rotate the same during cake removal.

The cake removal arrangement is shown generally at 31, such including a hollow cake removal operating shaft 32 which is journaled at one end in pressure-tight bearing 33 and its other end is journaled in bearing 34 in the end member 35 of tank 10. Washing fluid connection 36 is provided for feeding washing or sluicing fluid to hollow shaft 32. The shaft 32 extends through cover 11 and is connected to a cake removal shaft motor 37, motor 37 being connected through gearing 38 to shaft 32.

A cake removal means 31 is located between each of the pairs of leaves and also at the end leaves. Each cake removal means may include an arm 39 connected to shaft 32. Each arm 39 has fluid directing apertures 40 along the length thereof for directing or spraying the washing or sluicing fluid, if used, onto the adjacent face or faces of a filter leaf means.

A scraper blade means 41 (FIG. 4) is removably mounted on each of the arms 39. The scraper blade seen in FIG. 3 is of the type used between leaves, there being blades 43, 44 thereon. The end leaf scraper blade will have only one scraping edge. The blade is removably held in place by means of set screw 42.

When it is desired to remove cake, leaf rotating motor 29 is actuated to cause the filter leaves to rotate. Cake removal shaft motor 37 then is energized to cause shaft 32 to rotate clockwise (FIG. 2). This will carry arms 39 from a retracted position as shown in full lines in FIG. 2 to an active position indicated by the dotted lines, such being substantially horizontal. Assuming that the assembly is arranged only to sluice the cake from the leaves, the scraper blades will not have been assembled to the arms. The sluicing jets or spray from arms 39 will be directed onto the cake on the filter leaves so as to wash or sluice the same therefrom into the bottom of the tank as the filter leaves are rotated past the spray. If desired, of course, the arms 39 can be removed to a horizontal position before the sluicing fluid is admitted to the shaft and arms.

In the event it is desired to use the scrapers for dry cake discharge, such having been previously assembled onto the arms 39 when the filter is opened as seen in FIG. 3, rotation of shaft 32 will cause arms 39 to move or oscillate across the cake on the filter leaves as the leaves are rotated and such will remove the cake therefrom. The rate of oscillation or rotation of the cake removal shaft and the rotation of filter leaf shaft must be related so as to accomplish the desired scraping action across the entire face of the rotating leaves.

In some instances it may be desired to use both the scrapers and sluicing action. In this instance, shaft 32 is oscillatorily rotated with the scraper blades assembled thereto and sluicing fluid is supplied thereto at the same time.

In order to assist in support of the carriage assembly, rollers 45 may be mounted on shaft 46 which has bearings 47 upon which hollow center shaft 13 is carried. Rollers 45 are movable on tracks 48 supported on the inside of the tank 10. Additionally, the cake removal shaft 32 may have a bearing 47A.

A trough means 49 is located within tank 10, said trough means having a collecting portion or zone 50 at the lower part thereof. The collecting portion 50 has a configuration which partially surrounds conveyor means 51. Conveyor means 51 is constructed so that when rotated in one direction, cake will be moved longitudinally of the tank and toward the center. This is accomplished by providing a helix 52 and helix 53 arranged in opposite directions, each helix or screw moving cake from either end of tank 10 toward the central cake discharge 17A. Motor 54 may be connected to the conveyor for rotating the same.

In the illustrated filter leaf arrangement, hub 24 has the leaf assembly mounted thereon. The leaf includes conventional coarse wire screens 18. The exterior fine screens 19 are preformed into a disk-like form so as to have lips 61 which engage opposite sides of ring 71. A pair of mating clamping rings 62, 63 are placed on the periphery of the leaf, the rings being held together in clamping relationship by bolts or fastening means 64. The clamping rings and lips permit the scraper blade to pass close to and adjacent the faces of the leaves.

In a preferred form of scraper blade, a plastic strip 65 such as a polytetrafluoroethylene can be adjustably held by bolts 66 to the blade as seen in FIG. 11. This permits the scraper blade edge to be held in close contact or closely adjacent to the face.

It should be apparent that variations may be made in details of construction without departing from the spirit of the invention except as defined in the appended claims.

What is claimed is:

In a leaf filter wherein filter cake forms during operation thereof, the combination including an enclosing tank with an openable cover, rotatable filter leaf means including at least a pair of filter leaves mounted on a rotatable hollow shaft, said shaft being arranged to one side of the longitudinal center line of said tank, filter cake removing means including an oscillatable hollow shaft, the axis of said oscillatable shaft being outside the periphery of said filter leaf means, hollow arm means having one end mounted on said oscillatable shaft and including diverging spaced jet means therealong, scraper head means at the other end only of said arm means, said scraper head means including a pair of diverging scraper blade means mounted thereon and means for removably mounting said scraper head means on said other end of the arm means, said arm means and said scraper head means being capable of being located entirely outside of the periphery of said filter leaf means and being oscillatably movable relative to said filter leaf means, said scraper means being adaptable to coact with said filter leaf means when oscillatably moved from entirely outside the periphery of said leaf means so as to spirally scrape the cake therefrom, motor means for rotating said rotatable hollow shaft, bearing means at the end of said tank opposite to the cover for removably receiving both of the hollow shafts, means for moving said cover, filter leaf means, and shafts relative to said tank, means for feeding slurry to said tank, means for feeding sluicing fluid to the oscillatable hollow shaft for discharge through said jet means onto one face each of said filter leaves, means for removing filtered liquid from the rotatable hollow shaft and means to oscillate said oscillatable hollow shaft.

(References on following page)

References Cited by the Examiner

UNITED STATES PATENTS

| | | | |
|---|---|---|---|
| 1,169,725 | 1/1916 | Kilby | 210—334 |
| 1,227,983 | 5/1917 | Vallez | 210—327 X |
| 1,323,421 | 12/1919 | Sweetland | 210—486 |
| 1,438,797 | 12/1922 | Vachier | 210—327 |
| 1,502,700 | 7/1924 | Vallez | 210—334 |
| 1,510,568 | 10/1924 | Sweetland | 210—327 |
| 1,967,070 | 7/1934 | Walker | 210—327 |
| 2,754,796 | 7/1956 | Faulkner et al. | 118—204 |
| 2,799,397 | 7/1957 | Berline | 210—331 |
| 2,843,267 | 7/1958 | Anderson | 210—331 X |
| 2,975,903 | 3/1961 | Ulrich | 210—236 |

REUBEN FRIEDMAN, *Primary Examiner.*

J. DECESARE, *Assistant Examiner.*